Figure 2:
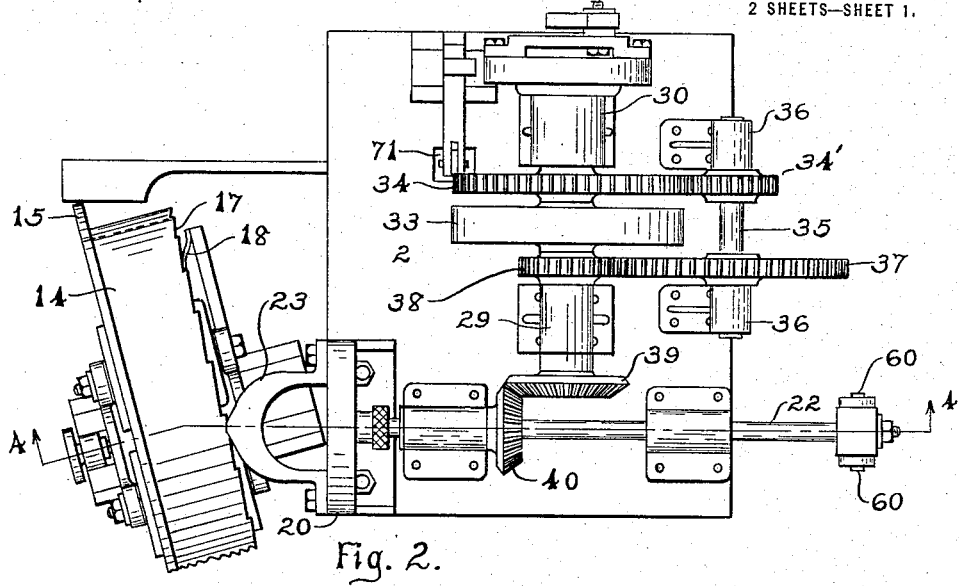

W. C. STEVENS.
CUSHION TIRE DRILLING MACHINE.
APPLICATION FILED MAR. 8, 1915.

1,171,552.

Patented Feb. 15, 1916.
2 SHEETS—SHEET 1.

WITNESSES:
John W. Kittredge
G. L. Ely

INVENTOR.
William C. Stevens
BY
ATTORNEY

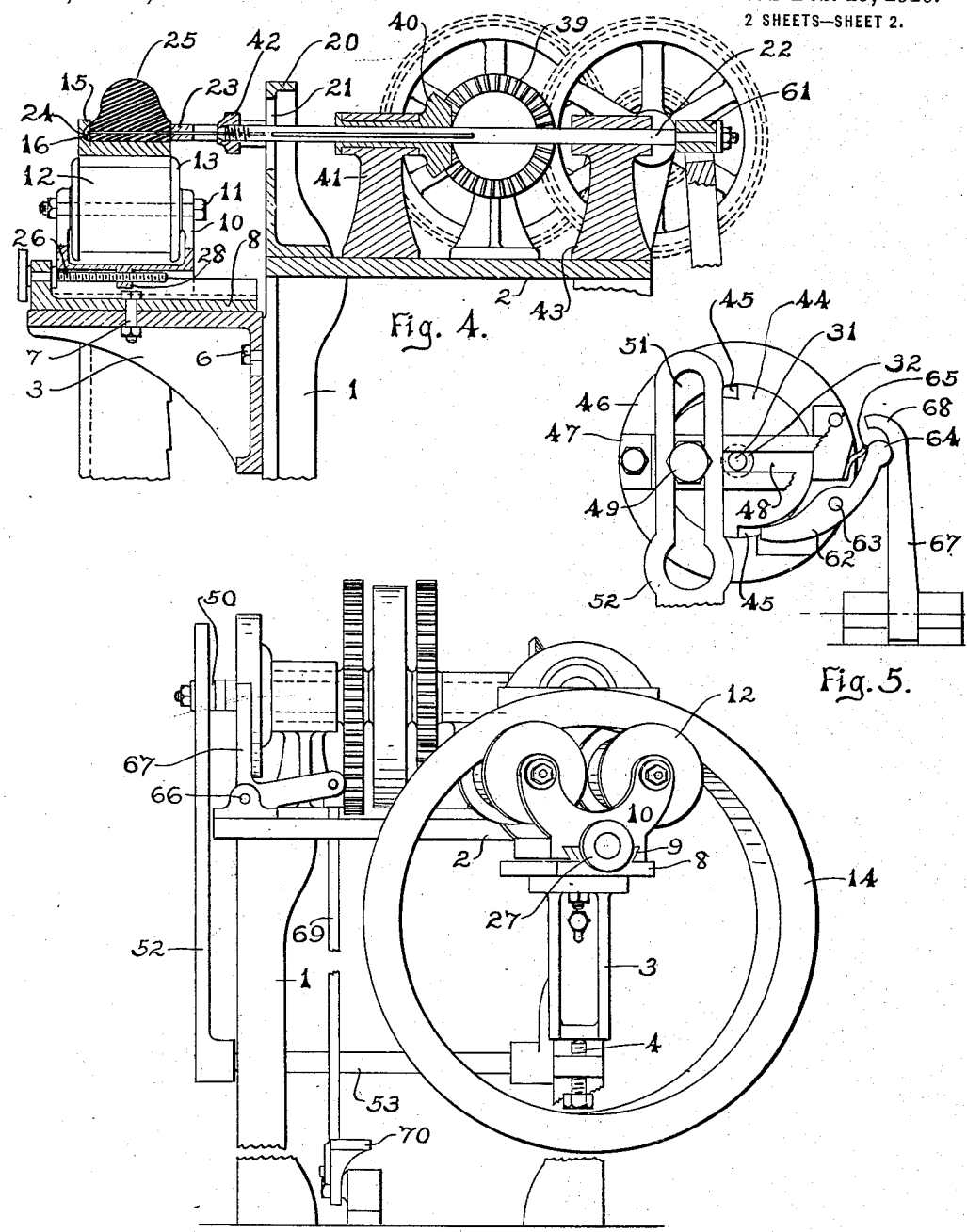

UNITED STATES PATENT OFFICE.

WILLIAM C. STEVENS, OF AKRON, OHIO, ASSIGNOR TO THE FIRESTONE TIRE & RUBBER COMPANY, OF AKRON, OHIO, A CORPORATION OF OHIO.

CUSHION-TIRE-DRILLING MACHINE.

1,171,552.           Specification of Letters Patent.      Patented Feb. 15, 1916.

Application filed March 8, 1915. Serial No. 13,045.

*To all whom it may concern:*

Be it known that I, WILLIAM C. STEVENS, a citizen of the United States, residing at Akron, in the county of Summit and State of Ohio, have invented certain new and useful Improvements in Cushion-Tire-Drilling Machines, of which the following is a specification.

The purpose of my invention is to construct a machine to be used in the manufacture of cushion tires in the base of which are placed a series of cross wires which project a slight distance beyond the edges of the tire and are adapted to be received under the circumferential side wires which hold the tire to the rim. My machine is for the purpose of drilling holes in the base of the tire through which these cross wires are placed. It is frequently desirable that the wires be placed in the tire at an angle and my machine is so constructed that the tire may be placed at any angle to the drilling needle for this purpose.

Figure 1:
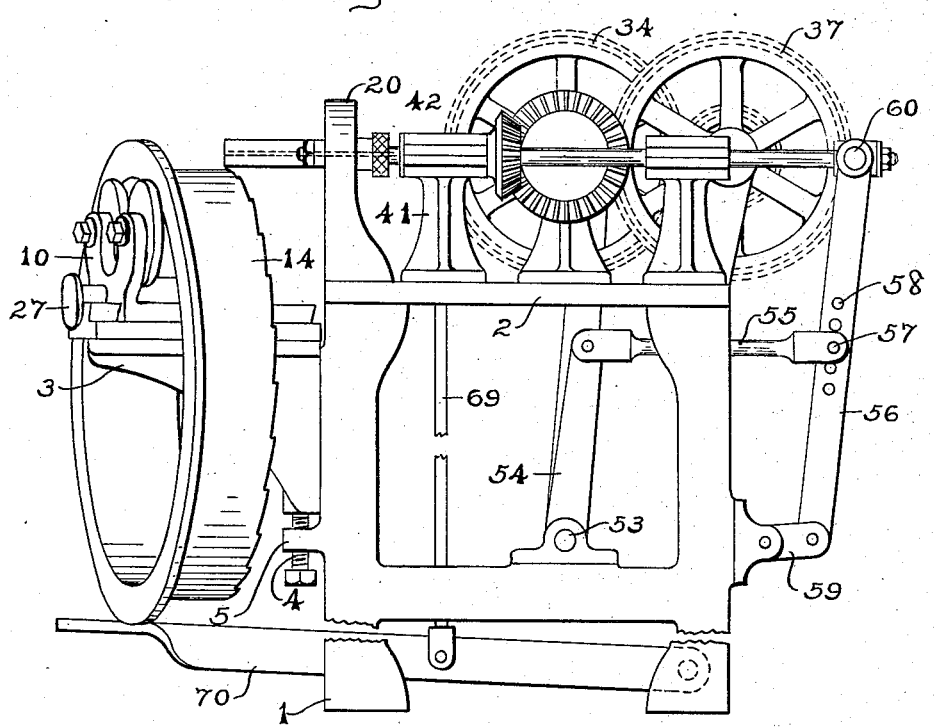

In the accompanying drawings I have shown an embodiment of my invention in which like reference numerals refer to like parts and in which:

Figure 1, is a side elevation of my machine; Fig. 2, is a plan thereof; Fig. 3, is a front elevation; Fig. 4, is a section on the line 4—4 of Fig. 2; Fig. 5, is an enlarged end view of the clutch for operating my machine.

In the drawings 1 represents standards across the upper ends of which is secured a bed plate 2 carrying the operating parts of the machine. On the upper end of one of the standards 1 is slidably mounted, a bracket 3 which is adjustable in a vertical plane by a bolt 4 in screw threaded engagement with the lug 5 on the standard 1 and bears against the under side of the bracket. A second bolt 6 passes through a slot in the face of the bracket and holds it to the standard. On the upper face of the bracket is mounted for rotary adjustment by means of a bolt 7 a plate 8 having on its upper face a dove-tailed guiding rib 9. On this guiding rib is slidably mounted a bracket 10 carrying bolts 11 on each of which is mounted a freely rotatable guiding spool 12 having flanges 13. Over the guiding spools is loosely hung an annular drum 14 over which the tire is placed. The outside edge of the drum 14 is provided with a flange 15 having an inwardly facing groove 16 into which the needle is adapted to pass as will be explained later. The inside edge of the drum carries a series of ratchet teeth 17 which are spaced a distance equal to the space between the holes in the tire and a spring pawl 18 is carried by the bracket and adapted to engage the teeth of the ratchet.

On the forward corner of the bed plate of the machine above the bracket 3 is secured an upright bracket 20 provided in the upper part with an opening 21 to allow the passage of the needle carrying shaft 22. On the upper part of the bracket 20 across the opening 21 is positioned a U shaped stripper 23, the nose of which bears against the side of the tire and is provided with an opening for the passage of the needle. The stripper assists in guiding the tire and its curved sides will perform this function regardless of the angle at which the tire is set.

The cushion tire 25 is placed about the drum 14 between the flange 15 and the nose of the stripper, the drum being adjusted to operate on tires of different widths by means of a feed screw 26 rotatively mounted in the forward end of the plate 8, operated by hand wheel 27 which screw passes through a lug 28 on the bottom of the sliding bracket 10. The needle 24 is given a rapid rotation and a comparatively slow reciprocation into and out of the tire by mechanism to be described. On the upper face of the bed plate 2 is mounted a pair of alined bearings 29 and 30 in which is mounted a shaft 31 on the rear end of which is loosely mounted a sleeve 32. The sleeve 32 has secured thereto a pulley 33 run by a belt from a suitable source of power. On the sleeve 32 is also secured a large gear 34 meshing with a pinion 34' secured to a counter shaft 35 mounted in bearings 36 secured to the bed plate of the machine. On the shaft 35 is secured a large gear wheel 37 meshing with a small pinion 38 secured to the shaft 31. On the forward end of the shaft 31 is keyed a beveled gear 39 meshing with a bevel pinion 40 splined to the needle carrying shaft 22 as shown in Fig. 4. The pinion 40 is mounted in the upper part of bearing 41 secured to the bed plate of the machine.

The shaft 22 carries at one end by means of a chuck 42, the needle 24. The other end of the shaft 22 is rotatively and slidably mounted in the bearing 43 rising from the bed plate 2. By this mechanism it will be seen that the needle 24 is given a rapid rotary movement.

The slow reciprocating movement is given to the needle by the following means: On the rear end of the sleeve 32 is secured a disk 44 provided with a pair of diametrically positioned ratchet teeth 45. Around the disk 44 is placed a rotary ring 46 to which is secured a diametrically placed bridge 47 provided with a slot 48 in which is adjustably secured a pin 49 provided with a sleeve 50 loosely received in a slot 51 at the upper end of a rocking lever 52. The lower end of the rocking lever 52 is secured to a transverse shaft 53 mounted in bearings on the frame. The forward end of the shaft 53 has secured thereto a lever 54 connected by a link 55 with a lever 56. A pin 57 connects the link 55 with the lever and passes through one of a series of holes 58 in the lever 56. By means of this series of holes it will be seen that I am enabled to adjust the length of travel of the needle. The lower end of the lever 56 is carried by a swinging link 59 from the frame and its upper end is pivotally connected to a pair of pins 60 projecting from a sleeve 61 loosely mounted on the end of the shaft 22.

The ring 46 is adapted to be driven from the disk 44 by means of a pawl 62 pivoted on the ring at 63 and provided with a rounded end 64 projecting outwardly from the ring, a spring 65 urging the pawl into engagement with the teeth at all times. Opposite the clutch on the bed plate at 66 is provided a bell crank lever 67 provided at its upper free end with a hook 68 which is adapted to catch the rounded end of the pawl and hold the ring from further rotation. The face of the bell crank lever toward the pawl is adapted when swung in the position shown in Fig. 3 to raise the pawl from its engagement with a ratchet 45. The bell crank lever is adapted to be rocked by a rod 69 connected to a treadle 70 and passing through a hole 71 in the bed plate of the machine.

From the above description of the machine, it is believed that its operation will be readily understood. The operator having set the drum 14 at the desired angle by means of the bolt 7 and given the proper longitudinal adjustment by means of the feed screw 26 places the tire over the drum between the flange and the nose of the stripper. He then presses down on the treadle 70 which allows the pawl 62 under the influence of the spring to engage one of the ratchet teeth in the disk 44 causing the ring 46 and the disk 44 to rotate in unison. The operation of the treadle starts the reciprocation of the needle which continues until the pawl is raised from engagement with the ratchet teeth by the lever 67 and the ring is stopped in its rotation by the locking of the free end of the pawl by the hook 68. The arrangement is such that the machine can be operated continuously by keeping the foot on the treadle or intermittently by momentary pressure of the treadle. During the whole operation the needle is given a rapid rotary motion by the gearing described while the reciprocation of the needle is comparatively slow.

The tire is fed by the operator who keeps his hand thereon and moves it with the drum 14. The drum is freely rotatable and the engagement of the pawl 17 with the teeth thereon prevents backward movement of the tire under the influence of the needle and also serves as a gage for accurately spacing the holes of the tire. The needle passes entirely through the tire and into the groove 16.

It is obvious that various changes and modifications might be made in the machine without sacrificing any of the advantages or benefits of my invention, and I do not wish to be restricted to the form shown in the drawing.

What I claim is:

1. In a machine for drilling cushion tires, in combination, a frame, a needle for drilling tires on said frame, a plate on said frame adjacent said needle, means for moving tires carried on said plate and means for adjusting said plate whereby the direction of the tire relative to the needle may be changed.

2. In a machine for drilling cushion tires, a frame, a needle for drilling tires on said frame, a plate on said frame adjacent said needle, movable tire supporting means carried by said plate and means for adjusting said plate whereby the direction of the tire relative to the needle may be changed.

3. In a machine for drilling cushion tires, a frame, a needle for drilling tires on said frame, a plate on said frame adjacent said needle, a tire supporting and advancing drum rotatably mounted on said plate, means for adjusting said plate whereby the direction of the tire relative to the needle may be changed and mechanism for passing said needle over said drum.

4. In a machine for drilling cushion tires, a frame, a needle for drilling tires in said frame, a plate on said frame adjacent said needle, a rotatable tire supporting and advancing drum on said plate, means for rotatively adjusting said plate whereby the direction of the tire relative to the needle may be changed, means for guiding the tire in its movement and means for reciprocating said needle over said drum.

5. In a machine for drilling cushion tires, a combination with means for moving and supporting a tire during its movement, of means for drilling the tire, means for changing the angle of the supporting means to the drilling means, and means for guiding the tire on the support, said last named means being conformable with the angular movement of the supporting means.

6. In a machine for operating on tires, the combination of an adjustable support for the tire, of means for drilling holes in the tire, consisting of a reciprocating needle, guides for the tire on the support, said guides being conformable to any angle of adjustment of the tire relative to the drilling means.

7. In a machine for operating on tires of differing widths, the combination of an adjustable support for the tire, of means for drilling holes in the tire, consisting of a reciprocating needle, guides for the tire on the support, said guides being conformable to any angle of adjustment of the tire relative to the drilling means and means for changing the distance between said guides to accommodate the different widths of tires.

8. In a machine for operating on tires, the combination of the support for the tires, of means for drilling holes in the tire comprising a reciprocating needle, guides for the tire on the support, means for changing the angle of the support relative to the drilling means, one of said guides being apertured for the passage of said drilling means.

9. In a machine for operating on tires of differing widths, the combination of the support for the tires, of means for drilling holes in the tire comprising a reciprocating needle, guides for the tire on the support, means for changing the angle of the support relative to the drilling means, one of said guides being apertured for the passage of said drilling means, means for changing the space between said guides to accommodate the different widths of tires.

10. A machine for operating on tires, comprising an annularly shaped drum constituting a supporting means for the tire, a guide provided with an opening and arranged to engage the lateral face of the tire while on said drum, and a perforating means adapted to pass through said opening in said guide and to form openings transversely in the supported tire.

11. A machine for operating on tires, comprising an annularly shaped drum constituting supporting means for a tire, a perforating means adapted to form an opening transversely in the tire, and pivotal means to support said drum to permit its revolution by a step by step movement, and further to permit the drum to be positioned at different angles with respect to the axial line of the perforating means.

12. A machine for operating on tires, comprising an annularly shaped drum constituting a supporting means for the tire, a guide engaging the lateral face of the tire, and provided with an opening, a perforating means adapted to pass through the opening in said guide and to form openings transversely in the supported tire, a pivotal support for said drum to permit it to be positioned at different angles with respect to the axial line of the drill while permitting its revolution, and means for spacing the drum in its movement.

13. A machine for operating on tires, comprising the combination of a perforating means, an annular drum for supporting said tire, a bracket located within the drum, rollers on said bracket sustaining said drum and means for pivotally adjusting said bracket whereby the angle of said perforating means relative to the tire may be changed.

14. In a cushion tire drilling machine, the combination with a frame, a support for tire on said frame, a flange on one side of said support, a needle on said frame, means for reciprocating said needle over said support, means for adjusting said support angularly with respect to the line of travel of said needle and a curved guide at the side of said support opposite said flange.

15. In a cushion tire drilling machine, the combination with a frame, a support for tire on said frame, a flange on one side of said support, a needle on said frame, means for reciprocating said needle over said support, means for adjusting said support angularly and longitudinally with respect to the line of travel of said needle and a curved guide above and at the side of said support opposite said flange.

16. In a cushion tire drilling machine, a combination with a frame, a support for a tire on said frame, a flange on one side of said support, a needle on said frame, means for reciprocating said needle over said support, means for adjusting said support angularly with respect to line of travel of said needle and a curved guide at the side of said support opposite said flange, the flange being provided with a groove and the guide with a recess for the accommodation of said needle.

WILLIAM C. STEVENS.

Witnesses:
J. J. SHEA,
R. E. GLASS.